Figure 1:
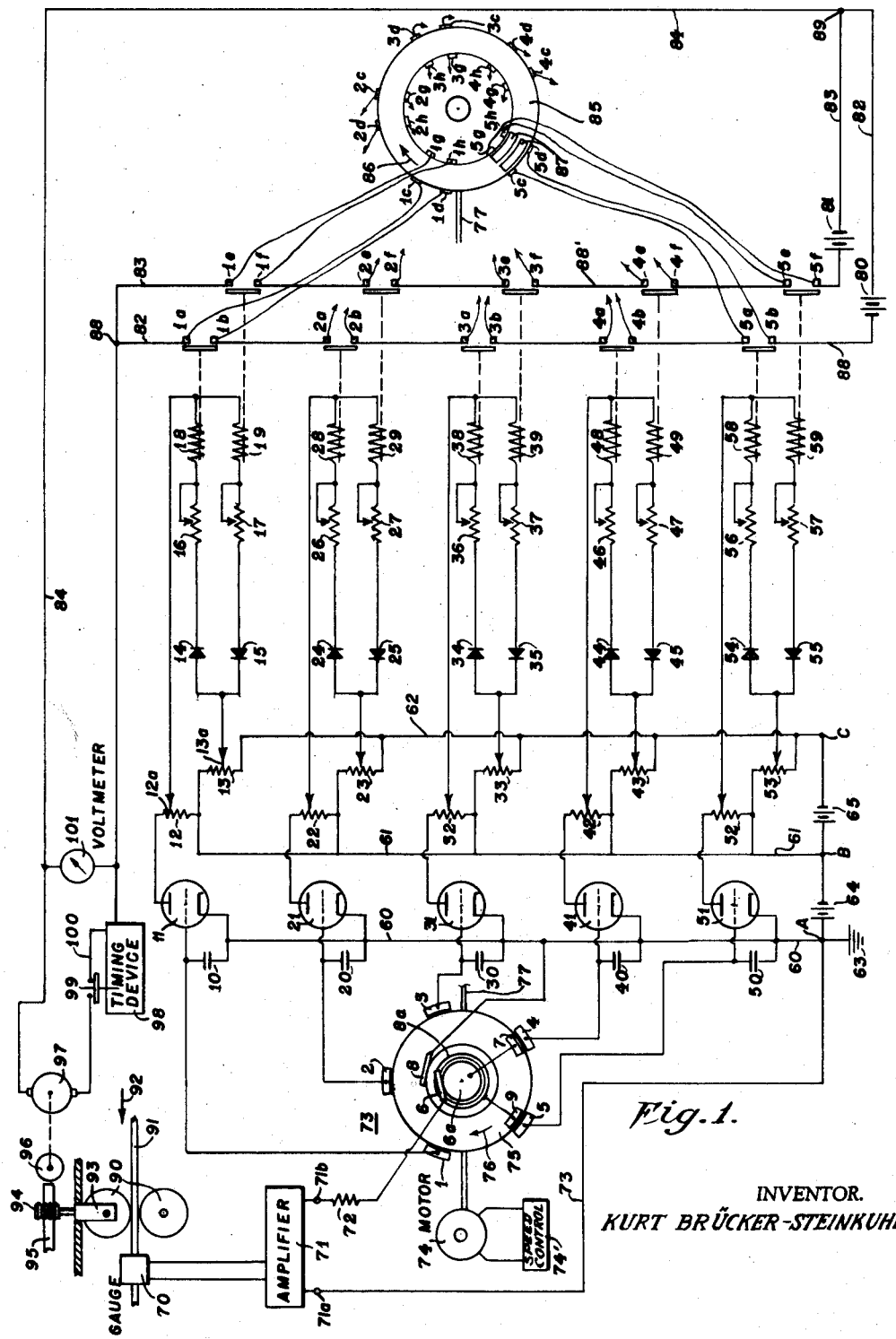

INVENTOR.
KURT BRÜCKER-STEINKUHL

United States Patent Office 3,170,140
Patented Feb. 16, 1965

3,170,140
CONTROL APPARATUS
Kurt Brücker-Steinkuhl, Liesegangstrasse 10,
Dusseldorf, Germany
Original application Dec. 30, 1957, Ser. No. 706,092, now Patent No. 3,117,261, dated Jan. 7, 1964. Divided and this application Sept. 14, 1961, Ser. No. 140,161
Claims priority, application Germany, Dec. 31, 1956, B 43,007
7 Claims. (Cl. 340—149)

The present invention relates to a control apparatus for a statistical quality control in production processes. More particularly, the invention relates to an electric control circuit based on the utilization of a train of discrete measuring pulses, often referred to as run of samples.

In supervising production processes, physical characteristics are checked in many instances, such as the thickness of bands or strips of material, the diameter of shafts, the pitch of screw threads, etc.

According to the present control system, consecutive production samples are tested and the test results examined as to whether they exceed an upper or lower limit of a given range of tolerance values. The single test values of a plurality of consecutive samples jointly constitute a sample group. If not all of the test values in a sample group are above the upper limit or not below the lower limit, this fact is taken as an indication that the production process operates normally. On the other hand, if all of the single test values of such a plurality of consecutive samples exceed the lower or upper limit of the range, the normal production process is considered disturbed to a degree that corrective measures are necessary.

Control systems which utilize averages of control values have been previously disclosed. According to such systems, a predetermined number of single sample values is obtained and the algebraic average of the single values is determined. Depending upon whether this average falls without or within a predetermined range of values, the production process is readjusted or not. After this check, an identical number of $n$ new samples is taken, an average of their single values is obtained. Thus, according to such prior systems, a predetermined number $n$ of single values is checked in every instance; only after digestion of these $n$ single values, say five single values which, obviously, requires a certain amount of time, it can be determined whether or not the production process requires any adjustment. If there is a sudden trouble in a manufacturing process controlled by means of the average system, it may happen that the trouble is recognized only after two or three average values have been taken, in other words the trouble will become known only after $2n$ or $3n$ single values have been taken and the averages thereof determined.

It is, therefore, one object of the present invention to provide a production control system, which offers considerable advantages, although this system also requires a definite number of single values to produce a sample group. However, once a sample group has been formed from $n$ single values, it is no longer necessary to take $n$ new single values to form a new sample group and to deal therewith. The new sample group is simply formed by discarding the first single value of the first sample group and adding a new single value thereto. This procedure is continuously followed in the described manner so that each taking of an individual value permits a determination of whether the production process is to be readjusted or not. Thus, trouble is recognized immediately after inception, much earlier than with other known control systems. Consequently, at modern high speed processes, the use of the present control system can be of decisive importance.

It is another object of the present invention to provide a production control system which consists of eliminating from a group of single test values, the first single value and adding in lieu thereof a new single value which system might be called a method of continuously forming sample groups.

With the control system using the continuous formation of sample groups, even in case of a suddenly developed trouble, this is recognized after taking a fraction only of $2n$ or $3n$ single values which, obviously, represents a substantial improvement over known device operating with averages only.

It is a feature of the present invention to provide, for example, $n$-signal comparing circuit networks each forming an error signal between an input signal indicative of a measuring or test value and a standard signal; input signals representing test values are fed cyclically in periodic sequence to these networks; error signals of one polarity if developed in the several circuits are then fed to a coincidence circuit network producing an output if there is an error signal of like polarity. Even signals of opposite polarity are fed to a second coincidence circuit network in $n-1$ of these networks. Thus, there are two coincidence circuit networks, one for each polarity. It is apparent, that these networks suppress random error signals and respond only to an orderly sequence of error signals of like polarity.

Each signal comparing network is devised with a storage element for an input signal whenever received via cyclic feeding device. Furthermore there is provided an erasing device, eliminating any stored signal prior to application of a new input signal in the next cycle.

Figure 2:
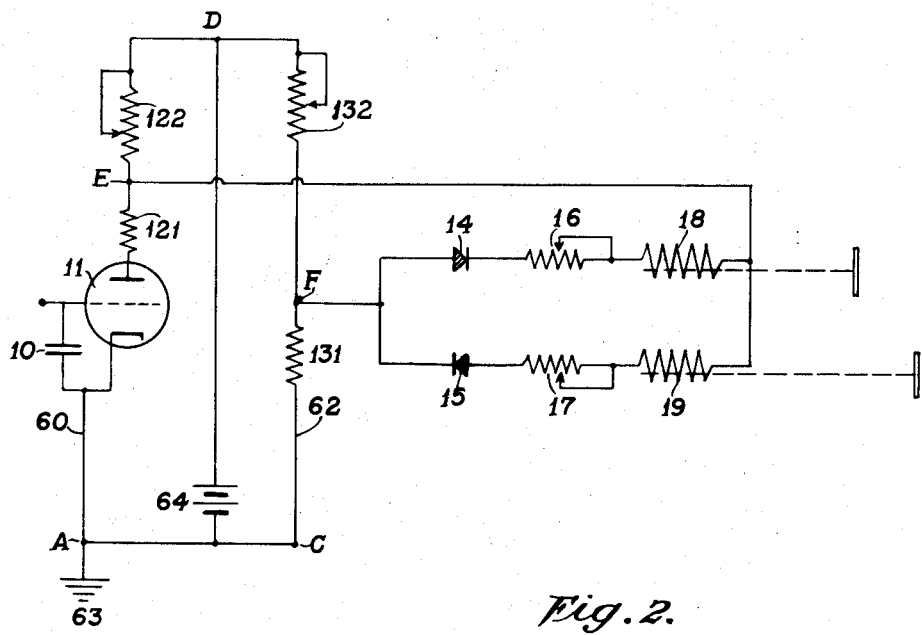

While the specification concludes with claims particularly pointing out and distinctly claiming the subject matter which is regarded as the invention, it is believed that the invention, the objects of the invention and further objects and advantages thereof will be better understood from the following description taken in connection with the accompanying drawing in which:

FIG. 1 is a diagrammatic illustration of the mechanical and electrical elements of a control system of the present invention; and FIG. 2 is a diagrammatic view of a particularly suitable embodiment of a circuit for checking single values according to the present invention.

Referring now to the drawings, in the following, the use of the present invention is exemplified in the thickness control for rolling strip steel. It is to be understood, however, that the present invention is confined neither to a checking of the thickness of strip steel nor to thickness control in general, but is equally suitable for controlling and measuring any other physical variables, such as length, weight, voltage, transparency, etc.

The rolling of steel strip material is a continuous process, the thickness of the product being continuously measured with an appropriate instrument. Out of the sequence of measurement, a train of discrete and spaced measuring values or pulses is selected. With appropriate changes, however, the present invention may be also used in conjunction with discontinuous production processes, such as the making of shafts etc.

The pre-established control limits for the single values of the sample groups are determined from the product of the control limit factor and a permissible standard deviation. The control limit factor for a predetermined size of sample groups can be taken from calculated tables and the standard deviation is computed from the single values of one or several sample groups. Since it can be assumed that, in most production processes, the standard deviation will not vary during production, it is sufficient to check standard deviations only occasionally.

When rolling steel strip material, automatic thickness gauges are usually employed which, being mounted some distance behind the mill, continuously show the thickness of the band steel on a dial indicator. It is practically impossible to maintain the thickness at exactly the desired value throughout the entire rolling process. As indicated by the fluctuating hand of the dial, deviations from the desired value of more or less magnitude occur which, however, must remain within specified tolerances. It is often difficult for the operator, particularly at a high speed mill, to determine the exact moment at which the rollers must be readjusted to keep the strip at approximately the desired thickness. In order to eliminate these difficulties, automatic regulating devices, according to the present invention, are provided. Operating according to statistical methods, these devices afford optimum production results because they are particularly quick in eliminating operation trouble.

FIG. 1 illustrates an embodiment wherein, according to the present invention, sample groups are formed from single values. A rotating electric switch permits the digestion and manipulation of altogether five single values. One of these five single values, namely the first, is discarded or eliminated; in lieu thereof, another single value is added so that the sample group which is to be tested each time consists of a sequence of four single values. Obviously, the number four is not intended as a limitation; sample groups consisting of more or fewer than four single values can be used just as well.

The numeral 90 indicates a rolling mill for the production of strip steel 91 which passes in the direction of the arrow 92, between the two rollers of the mill. As shown, the upper of the two rollers is mounted to permit a variable and adjustable rolling pressure. For example, the mounting 93 of the upper roller may be provided with a spindle 94, operated by a worm gear 95. The latter, in turn, is driven by a pinion 96, actuated by a servo motor 97. Rotation of motor 97 in one direction causes upward motion of the spindle 94 and, thereby a decrease in roller pressure, whereas rotation of motor 97 in the other direction produces downward motion of the spindle and increase in roller pressure.

The control loop causing motor 97 to operate as a servo motor will be explained in the following:

The thickness of the material is continuously measured with a thickness gauge 70 emitting a voltage that is proportional to the thickness. This voltage is amplified by an amplifier 71 connected to gauge 70. Amplifier 71 has output terminals 71a and 71b which also serve as the main input terminals for the control circuit in accordance with the present invention. Terminal 71a is grounded at 63. Terminal 71b is connected to a slider 6 via a resistor 72, and slider 6 is connected with a periodically acting switching device 73. FIG. 1 of the drawing shows two rotating cyclically operating switch members 75 and 85 of double switch 73, mounted on a shaft 77 which is rotated by an auxiliary motor 74. The latter is regulated by a speed control device 74' permitting speed adjustment according to the desired switching period.

The potential at input terminal 71b is fed to slider 6 which contacts a hub or cylinder 6a mounted on the rotating, cyclically operating switch member 75; the input voltage is passed to a rotating contact element 7 and from there, depending upon the rotary position of the switch, to stationary contact elements 1, 2, 3, 4 and 5.

FIG. 1 of the drawing illustrates a position in which the rotating element 7 contacts the stationary element 4. The stationary contact elements 1, 2, 3, 4 and 5 are respectively connected to one side of capacitors 10, 20, 30, 40, and 50 and to control grids of tubes 11, 21, 31, 41 and 51, respectively. The other sides of the capacitors 10, 20, 30, 40 and 50 are jointly connected to ground 63 via a line 60; the cathodes of the tubes 11, 21, 31, 41 and 51 are connected to line 60 and thus grounded.

Arranged so as to precede the rotating contact element 7 is a likewise rotating contact element 9, connected to a hub or cylinder 8a which is also mounted on member 75 but electrically insulated from the cylinder 6a. A stationary slider 8 held in sliding contact with the cylinder 8a is likewise grounded through lead 60. The angular distance between the two rotating elements 7 and 9 is equal to that of the respective stationary elements 4 and 5. Stationary contact elements 1 to 5 are equally spaced from each other and therefore the angular distance of elements 7 and 9 equals the angular distance between any two adjacent stationary contact elements. Consequently, the moment the element 7 arrives at element 4, the element 9 contacts the element 5. In the illustrated arrangement, the switch 75 rotates clockwise, in the direction of the arrow 76.

The anodes of tubes 11, 21, 31, 41 and 51 are connected to respective plate resistors 12, 22, 32, 42 and 52, designed as potentiometers having one slide connected to a common line 61. Line 61 connects a plate-voltage source 64 having terminals A and B to the anodes of tubes 11, 21, 31, 41 and 51. In addition to being connected to line 61, the same junction of each potentiometer 12, 22, 32, 42 and 52 is respectively connected to one end of potentiometers 13, 23, 33, 43 and 53, whose other ends are connected to a common lead 62. Connected across leads 61 and 62 is another voltage source 65 having terminals B and C. Voltage sources 64 and 65 are interconnected with a like potential terminal placed at a common terminal B. Terminal A, of course, is grounded. Source 64 passes current from terminal B through 61 and 12-11, 22-21, 32-31, 42-41 and 52-51, respectively, to ground terminal A. Source 65 passes current from terminal B through the potentiometers 13, 23, 33, 43 and 53, respectively, to line 62 and terminal C.

A sliding contact 13a connects the potentiometer 13 with two parallel circuit branches, one comprising a diode 14, a rheostat 16 and a relay 18, while the other branch comprises a diode 15, a rheostat 17 and relay 19. The circuit is completed by a common line from relays 18 and 19 to tap 12a of potentiometer 12. The diodes 14 and 15 have mutually opposed poling so that the branch circuit of diode 14 conducts only in one direction (from left to right in the drawing), and the branch circuit of diode 15 conducts only in the other direction.

It is apparent that each relay together with its series connected diode constitutes a polarized relay. It is further apparent, that the voltage drops across resistor portions of potentiometers 12 and 13, or, in other words, the potentials of taps 12a and 13a are compared by means of two networks each including a polarized relay. Elements 12 to 19 constitute a signal or voltage comparison circuit network, wherein an error signal can be developed which, dependent upon its polarity, can actuate either the relay 18 or relay 19. In an analogous manner, each of the potentiometers 23, 33, 43 and 53 is provided with similar branch circuits, including the components 24–29, 34–39, 44–49 and 54–59, and constituting similar signal comparison circuit networks with polarity dependent outputs.

The rheostats 16 and 17 (and 26, 36 etc.) are adjusted and the relays 18 and 19 (and 28, 38 etc.) are rated for response to current values above a given minimum and to permit the flow of such minimum currents through the coils of relays 18, 19 only if currents of a corresponding minimum value flow through potentiometers 12, 13. As soon as sufficient current flows through, either one of the coils of relays 18 and 19, the normally open relay contact closes and bridges the terminals 1a and 1b or 1e and 1f. The branch circuits for tubes 21, 31, 41 and 51 are similar so that, for example, upon actuating the relay 28 or 29, the terminals 2a and 2b, or 2e and 2f are connected with each other.

From the foregoing it will be understood that the relays 18, 28, . . . 58 will respond to like unipolar error signals respectively developed at potentiometers 12, 13; 22, 23; . . . 52, 53 while relays 19, 29, . . . 59 will respond to error signals of like polarity, also developed at these potentiometers but being of opposite polarity as those effective at relay 18, 28 etc.

Contacts 1a, 1b, 2a, 2b, 3a, 3b, 4a, 4b, 5a, 5b are all connected in series by line means 82, and they are connected to a voltage source 80. This series circuit network constitutes a coincidence circuit, which upon closure of all relays 18, 28, 38, 48 and 58 causes the voltage of source 80 to be applied between terminals 88 and 89. Correspondingly, line means 83 interconnect the contacts with subscript e and f so as to form a second coincidence circuit controlled by relays, 19, 29, 39, 49 and 59 and adapted to place another voltage source 81 across terminals 88 and 89.

The terminals 1a, 1b and 1e, 1f are respectively connected to stationary contacts 1c, 1d and 1g, 1h of rotary switch 85. In an analogous manner, all other terminals of the relay contact are connected to respective contacts of the rotary switch. Thus, the terminals 2a, 2b and 2e, 2f are respectively connected to stationary contacts 2c, 2d and 2g. In order to simplify the drawing, the wiring connections beginning with the terminals 2a, 2b and including the contacts 4g, 4h has been indicated by arrows only.

The switch 85 rotates clockwise, as indicated by the arrow 86. Attached to the rotating part of the switch 85 are two contact elements 87 which are insulated from each other and which, depending upon the position of the rotating switch 85 or contact elements 87, respectively bridge the contacts 1a, 1b and 1e, 1f. The rotating part of switch 85 is actuated in synchronism with the switch 75, and the contact 87 co-operates with contact 9 of switch 75. Thus, if, as shown in FIG. 1 the contact element 9 of switch 75 is in a position adjacent to the fixed contact element 5 which is part of the grid circuit of tube 51, the rotating contact of switch 85 establishes a connection between the fixed contacts 5a, 5b, and 5e, 5f that are associated with tube 51. The purpose of switch 85 is to simulate a response to those two relays pertaining to that one of the voltage comparison circuits, the input capacitor of which, is momentarily discharged via rotary contact 9.

The moment that all of the contacts 1a–1b, 2a–2b, 3a–3b, 4a–4b and 5a–5b are connected with each other, either directly by the action of relays 18, 28, 38, 48 and 58, or through the bridging action of the contact elements 87 of switch 85, the line 82 connects a voltage source 80 to terminals 88 and 89, as stated so that this voltage source 80 be connected to a timing device 98.

Similarly, when all contacts 1e–1f, 2e–2f, 3e–3f, 4e–4f and 5e–5f are bridged by the action of respective relays 19, 29, 39, 49, 59 or by the action of the contact elements 87 in switch 85, the other voltage source 81 is connected to the timing device 98.

Relative to timing device 98, the two current sources 80 and 81 have mutually opposing poling. Hence, either a positive or a negative voltage is applied to the timing device. By means of a wire 84 the terminal 89 which is the junction of the two voltage sources 80 and 81, is connected to one terminal of the motor 97, the other terminal of which is connected to the contact 99 of the timing device.

A wire 100 and a relay enclosed in the timing device connect contact 99 to terminal 88. The contact 99 of the timing device is normally closed. If current is supplied to the motor 97 from one of the sources 80 or 81, the contact 99 drops off after a certain adjustable time interval $t_1$, and the current supply to the motor ceases. After a further, likewise adjustable time interval $t_2$, the contact 99 again closes automatically.

The interval $t_1$ determines the amount of adjustment of the rolling mill caused by the action of motor 97. The interval $t_2$ is preferably selected as equivalent to the time required for a given part of the strip steel to travel from between the rollers 90 to the thickness gauge 70.

A voltmeter 101 indicates the voltage difference between the terminals 88 and 89.

The embodiment illustrated if FIG. 1 operates in the following manner: The thickness gauge 70 produces a variable voltage proportional to the momentary thickness of the strip steel. After amplification in amplifier 71, a corresponding voltage is applied in cylical succession to the contacts 1, 2, 3, 4, 5, 1, 2 etc., of switch 75 and to the storing capacitors 10, 20 etc., of tubes 11, 21, etc. Because of the chopping action of switch 75, the measuring voltage reaches the respective tubes only during small definite time intervals, thus selecting a train of individual samples or pulses out of a continuous succession of the measuring voltage. The capacitors 10, 20, 30, 40 and 50 are charged according to the measuring voltage of these samples, and the charging condition of the capacitors in turn determines the respective grid voltages and, thus, the plate current flowing in tubes 11, 21, 31, 41 and 51. Inasmuch as the tubes control balance and unbalance of the voltage comparison circuit networks to which they are connected, storage capacitors 10, 20 etc., indirectly determine balanced and unbalanced state of these comparison circuits.

The capacitors and their respective time constants are appropriately selected so that the grid voltages remain substantially unchanged during one rotation of switch member 75.

Now, before any of the capacitors is again charged with another voltage impulse during the next rotation (next cycle) of switch 73 (having the members 75 and 85) the capacitor charges produced by the first voltage pulse must be eliminated and the associated tube must be ready for the next operation. This is also accomplished by cyclic switch member 75. Whereas charging takes place by means of the rotating contact element 7, the rotating contact element 9 causes a discharge of the capacitors in respectively connecting the grid side of each capacitor to ground. As mentioned, the angular distance between 7 and 9 is exactly the same as that between two adjacent stationary contact elements such as 4 and 5. In the sequence 5, 1, 2, 3 and 4 shown in FIG. 1, the contact element 5 and the capacitor 50 connected therewith receive the first charge. Since the capacitor 50 is discharged through elements 5, 9 and 60, this first or initial measuring value is discarded. After such discharge, the capacitor 50 is ready for the next charge through contact element 7 upon further rotation of the switch.

In the illustrated position of the switch, the tubes 11, 21, 31 and 41 connected with the stationary contact elements 1, 2, 3, and 4 represent the sample group. Upon the next rotation of the switch, the tubes 21, 31, 41 and 51 become the sample group so that with each turn of the switch, a different sample group is provided for checking.

In the following, the operating conditions within the circuit of tube 11 are described as typical, the conditions in the circuits of tubes 21, 31, 41 and 51 being similar. Upon the application of a certain grid voltage which depends on the momentary thickness of the band steel, a certain amount of plate current passes through tube 11 and potentiometer 12. Simultaneously, the resistor 13 is traversed by a constant current which depends only upon the voltage of source 65. The potentiometer taps 12a and 13a are adjusted in such a manner, that, at a certain grid voltage which is equivalent to the desired thickness of the band steel, no voltage difference exists between the potentiometer taps 12a and 13a. As a result, no current then flows through the adjacent circuit branches, including the relays 18 and 19.

Only when the band thickness commences to vary from the desired thickness and, as a result of such variation, the grid voltage becomes smaller or larger than the adjusted standard grid bias, an error signal is developed across taps 12a and 13a and a current passes through either relay 18 or relay 19. The response of relays 18 and 19 is adjusted by means of the resistors 16 and 17 so that one of them picks up only after a certain minimum voltage difference between the taps 12a and 13a is exceeded. This minimum error voltage is equivalent to the change in the grid bias voltage and, consequently to the change in the thickness of the band steel. Thus, the relays 18 and 19 are actuated only if the change in thickness exceeds a pre-estabished tolerance. Appropriate adjustment of the resistor 16 and 17 thus provides for respective response limits of the thickness control.

If the change in thickness is uniform over a certain length of strip steel and the change exceeds the preadjusted limit in one or the other direction, all four tubes 11, 21, 31, and 41 will behave alike. For example, the four relays 18, 28, 38, and 48 will close the circuit from 1a–1b to 4a–4b. In this situation, tube 51 is not ready to act but the contacts 5a–5b are, therefore, bridged by the switch 85. The coincidence circuit connecting the source 80 with the timing device 98 and the motor 97 is closed, and the latter adjusts the gap between the rollers in one direction.

If, however, the relays 19, 29, 39 and 49 are actuated, the circuit connecting the source 81 of opposite polarity with the timing device and the motor is closed and the latter adjusts the roller gap in the other direction.

Inasmuch as the relays 18 and 19, 28 and 29 etc., cannot be actuated at the same time, the circuits between 1a and 5b on the one hand and between 1e and 5f on the other hand cannot be closed at the same time, Therefore, only three different operating conditions are possible:

(1) All four measured pulses are above the upper control limit; the four relays 18, 28, 38 and 48 close, contacts 5a and 5b being bridged and the coincidence network in line 82 causes to energize motor 97 for rotation in the direction causing reduction in thickness of the material to be rolled.

(2) All four test values are below the lower control limit; the four relays 19, 29, 39 and 49 close, contacts 5e and 5f being bridged and the coincidence network in line 83 causes to energize motor 97 for rotation in the direction causing increase in thickness of the material to be rolled.

(3) At least one of the four test values lies below the upper limit and above the lower limit; at least one of the four relays 18, 28, 38, 48 and at least one of the four relays 19, 29, 39 and 49 is not actuated and the coincidence circuits in lines 82 and 83 remain open. The motor 97 is not energized and the thickness of the material is not changed.

It is thus apparent, that the coincidence networks as respectively controlled by the relays suppress random error signals, while a unipolar deviation at gauge 70 producing an orderly sequence of unipolar error signals will cause either one of the coincidence networks to respond, thus activating the servo-mechanism.

By means of the timing device 98, the servo motor is turned on only a predetermined length of time as required for attaining the desired change in thickness. However, the timing device 98 can be also made dependent upon the current flowing through the relays 18 or 19, 28 or 29 etc., whereby the period of time during which the motor is in action, and the amount of roller pressure which is regulated becomes dependent upon the degree of thickness deviation beyond the permissible limits.

After adjustment of the rollers 90, the rolled strip steel requires a certain time to reach the thickness gauge 70. Ordinarily, material passing from the roller to the thickness gauge would emit additional adjustment signals. In order to prevent such signals from becoming operative, the timing device 98 provides that the contact 99, once opened, will close only after elapse of an adjustable timing interval which is at least equal to the travel time of the material from the rollers 90 to the thickness gauge 70.

Aside from regulating the thickness of rolled band steel, the device can be also used to only indicate whether or not an adjustment is required. The voltmeter 101 serves this purpose, since it functions regardless of whether or not the motor 90 is energized. Any deflection of the needle indicates that an adjustment in one or the other direction is required.

It is known that the thickness of strip steel does not only depend upon the pressure exerted by the rolling mill, but also upon the rolling speed. Consequently, the thickness can be adjusted not only by means of lifting or lowering the rollers, but also by altering the speed at which the band is being pulled through the mill. The regulating voltage of the device according to the present invention can be advantageously used to appropriately alter the field strength of the capstan motor or other variable-speed drive that determine the speed of the material.

FIG. 2 illustrates another advantageous signal comparison circuit network for digesting and utilizing measuring values. The modification is illustrated with respect to the output circuit of tube 11, the circuits of the other tubes being exactly the same.

The circuit according to FIG. 2 differs in the following from that shown in FIG. 1:

(1) The voltage source 65 is eliminated and point C is directly connected with point A and thus is grounded.

(2) The potentiometers 12 and 13 are each divided into a constant resistor 121 and 131 respectively, and a variable resistor 122 and 132 respectively.

All other designations of FIG. 2 are identical with those of FIG. 1. The circuit according to FIG. 2 represents a bridge network. The four resistor branches of the bridge are formed by the inner resistance of tube 11 plus resistor 121, and by the resistors 122, 131 and 132. The voltage of source 64 is supplied to the bridge at the opposite points A, C, and D, respectively. The signal voltage is taken from bridge points E and F which, depending upon the respective direction, causes flow of current through relay 18 or 19.

The resistor 122 can be replaced by a second tube identical with tube 11. In this case, the two tubes preferably from two portions of a twin tube having a single envelope. In this manner, changes in the tube properties are mutually compensated and the normal bridge balance is not disturbed.

The present application is a division of application S.N. 706,092 filed December 30, 1957, and issued January 7, 1964, as U.S. Patent 3,117,261, and the invention is not limited to the embodiments described above, but all changes and modifications thereof not constituting departments from the spirit and scope of the inventions, are intended to be covered by the following claims.

What I claim is:

1. In a production control system, a control circuit to be interposed between a measuring device and a servo mechanism, said control circuit comprising: a first plurality of unipolar error signal producing circuit networks, including means establishing standard signals for said networks; a second plurality of unipolar error signal producing circuit networks including means establishing a standard signal for said networks, said first and second plurality of networks producing error signals of opposite polarity; first terminal means adapted to be connected to a measuring device; means for cyclically and sequentially connecting each of said first networks and each of said second networks to said terminal means; and two coincidence circuits respectively associated with and connected to said first and second plurality of networks and each responding to a common response of all its associated networks.

2. A control circuit comprising: terminal means; a plurality of similar electric signal comparison circuit networks, each having a signal input terminal and being capable of producing a first or a second output dependent upon the polarity of the deviation of a signal received at said input terminal from a standard signal; a cyclically operated switch connecting said terminal means in succession to said signal input terminals of said comparison circuits; first circuit means for combining all of said first outputs to form a common output; second circuit means for combining all of said second outputs to form another common output; output terminal means; and third circuit means connected to said first and second circuit means for rendering said common outputs effective at said output terminals for a predetermined time.

3. A control circuit comprising: a plurality of similar voltage comparison circuits each including a polarized relay responsive to an unipolar deviation between two voltages compared in such circuit; a like plurality of voltage storage elements respectively connected to said circuits, the voltage of each storage element determining balance and unbalance of the associated circuit; means connected to said storage elements for cyclically feeding discrete voltage pulses thereto; a circuit means responsive to simultaneous energization of said relays; and cyclically operated means for cyclically removing said voltages from any storage element before another pulse is applied thereto.

4. A control apparatus comprising in combination: a plurality of equally spaced circularly arranged contacts; a like plurality of signal comparison circuits respectively connected to said contacts, each circuit including a first resistor connected to the respective associated stationary contact, a second resistor connected in series to said first resistor, a first polarized relay operating upon a first contact, a second polarized relay operating upon a second contact and being connected in parallel to said first relay at opposite polarity, means for connecting said relays across at least a portion of said two resistors; a pair of output terminals; a first electric voltage source connected to all of said first contacts of said circuits and to said output terminals; a second electric voltage source connected to all of said second contacts of said circuits in series and to said output terminals; a third voltage source common as bias source for said resistors and connected thereto; and a rotary contact successively contacting said stationary contacts.

5. A control circuit comprising: a plurality of similar voltage comparison circuits each including two polarized relays including series connected diodes and having adjustable response voltages and being responsive to minimum voltage deviations of opposite polarity; voltage means for biasing said circuits; capacitors connected to each of said circuits, the charge of each capacitor being compared with the biasing voltage in each comparison circuit; a cyclically operated switch having one input line and a plurality of output lines respectively connected to said capacitors; means for removing any charge from said capacitors before the completion of a cycle; and means separately responsive to the response of all relays which are responsive to voltage deviations of one polarity.

6. A control circuit comprising; a cyclically operating switch having one input line and a plurality of $n$ output lines successively connected to said input line; a plurality of $n$ similar voltage comparison circuits respectively connected to said output lines, each circuit producing an output in response to a deviation of an input voltage and a predetermined reference voltage; means responsive to voltage deviations of similar polarity of input voltages from reference voltages in at least $n-1$ of said comparison circuits and producing an output signal in response thereto; and means for deleting said input voltages from each of said comparison circuits before completion of one cycle, while simulating the production of an output signal of the pertaining comparison circuit.

7. A control apparatus comprising in combination: a pair of input terminals; a pair of output terminals; a plurality of circularly arranged, equally spaced stationary contacts; a first rotary contact connected to a first one of said input terminals and successively contacting said stationary contacts; a voltage source with one pole connected to a second one of said input terminals; a like plurality of circuits respectively associated to said stationary contacts, each circuit comprising, a capacitor connected between the associated stationary contact and the second of said input terminals, an electron tube having its grid-cathode path connected across said capacitor, a plate resistor connected to the plate of said tube and the other pole of said voltage source, a second resistor connected to said plate resistor, means for biasing said second resistor, relays polarized by means of series connected diodes and being in parallel and in opposition with regard to their polarization across at least a portion of said plate resistor, and said second resistor, a first and a second contact governed respectively by said relays; first circuit means for connecting all of said first contacts in series; second circuit means for connecting all of said second contacts in series; said first and second circuit means being connected to said two output terminals; a second rotary contact rotating together with said first rotary contact and also engaging said stationary contacts with a phase shift corresponding to the annular distance of adjacent stationary contacts, said second rotary contact being connected to said second input terminal; and a third rotary contact rotating together with said first and said secondary rotary contact, and respectively overbridging those contacts of one of said circuits, the respective capacitor of which is being discharged via said second rotary contact.

References Cited in the file of this patent

UNITED STATES PATENTS

| | | |
|---|---|---|
| 2,616,068 | McDonald | Oct. 28, 1952 |
| 2,660,077 | Macanlay et al. | Nov. 24, 1953 |
| 2,837,732 | Nelson | June 3, 1958 |
| 2,932,089 | Dexter et al. | Apr. 12, 1960 |
| 2,942,161 | Bell | June 21, 1960 |
| 3,015,974 | Orbom et al. | Jan. 9, 1962 |
| 3,023,399 | Dickinson | Feb. 27, 1962 |